(12) United States Patent
Mitchell et al.

(10) Patent No.: US 9,315,342 B1
(45) Date of Patent: Apr. 19, 2016

(54) SYSTEM AND METHOD FOR TRANSPORTING WIRE COMPONENTS THROUGH PNEUMATIC TUBES BETWEEN WIRE COMPONENT PROCESSING STATIONS

(71) Applicant: The Boeing Company, Chicago, IL (US)

(72) Inventors: Bradley J. Mitchell, Snohomish, WA (US); Nick S. Evans, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/501,944

(22) Filed: Sep. 30, 2014

(51) Int. Cl.
*G06F 7/00* (2006.01)
*B65G 51/02* (2006.01)

(52) U.S. Cl.
CPC ..................................... *B65G 51/02* (2013.01)

(58) Field of Classification Search
CPC ........ B65G 51/00; B65G 51/01; B60L 11/14; B60L 11/1818; B60L 11/1846; B60L 2210/30; B60L 2230/12

See application file for complete search history.

(56) References Cited

U.S. PATENT DOCUMENTS

| | | | | |
|---|---|---|---|---|
| 3,738,078 A | * | 6/1973 | Schaaf | B65B 19/34 53/236 |
| 3,976,108 A | * | 8/1976 | Caveney | B65B 13/027 140/93 A |
| 2007/0200344 A1 | * | 8/2007 | Guest | G02B 6/4459 285/322 |

* cited by examiner

*Primary Examiner* — Yolanda Cumbess
(74) *Attorney, Agent, or Firm* — Perman & Green, LLP

(57) ABSTRACT

In accordance with one or more aspects of the disclosed embodiment, a system for transporting wire components during the assembly of wire bundles includes an air-operated tube network connecting a transport source station to a plurality of transport destination stations, the air-operated tube network comprising a junction coupled between the transport source station and the plurality of transport destination stations, and a system controller that includes a wire bundle assembly program, the system controller programmed to automatically transmit wire components from the source station to at least one of the transport destination stations based on the wire bundle assembly program.

20 Claims, 9 Drawing Sheets

SYSTEM AND METHOD FOR TRANSPORTING WIRE COMPONENTS THROUGH PNEUMATIC TUBES BETWEEN WIRE COMPONENT PROCESSING STATIONS

FIELD

The aspects of the exemplary embodiment generally relate to a system for transporting wire components and, more particularly, to a system for transporting wire components through pneumatic tubes.

BACKGROUND

Wire component transport systems are often employed in the transportation of wire components between wire component processing stations within a manufacturing system. The wire component transport systems employed today often are unchanged from the systems used in the 1940s. These conventional wire component transport systems are often expensive and inefficient. For example, many of the conventional means for transporting wire components involve a worker or a machine placing bundles of wire components prepared at a wire component processing station in a transportable container such as a hopper, tote, bucket or other container. These transportable containers are often transported or hand-delivered by way of carts or conveyor systems or other conventional transport means.

Conventional wire component transport systems introduce several disadvantages to their use. For example, conventional wire component transport systems often employ workers engaging in manual labor. Because of this, the labor costs associated with a conventional wire component transport system may be quite high. Further, because of the manual labor involved in conventional wire component transport systems, there is also the risk of human error associated with the conventional systems as well as possible injuries experienced by workers. Additionally, conventional wire component transport systems often have high Mean Time Between Operations (MTBO). For example, often, after a wire component is processed, the wire component is then bundled and placed in containers/buckets in batches. These batches are then sent to a destination processing station one batch at a time. Because of this, the average time between transports of wire component may be high, adding to lost time and inefficiency as the system waits for the containers or buckets to be sufficiently filled before sending it out. Because of this, conventional wire component transport systems are often inefficient.

SUMMARY

In accordance with one or more aspects of the disclosed embodiment, a system for transporting wire components during the assembly of wire bundles includes an air-operated tube network connecting a transport source station to a plurality of transport destination stations, the air-operated tube network comprising a junction coupled between the transport source station and the plurality of transport destination stations, and a system controller that includes a wire bundle assembly program, the system controller programmed to automatically transmit wire components from the source station to at least one of the transport destination stations based on the wire bundle assembly program.

In accordance with one or more aspects of the disclosed embodiment, a method for transporting wire components includes pneumatically transporting a wire component from a transport source station to at least one transport destination station through an air-operated tube network connecting the transport source station and the at least one transport destination station based on a wire bundle assembly program.

In accordance with one or more aspects of the disclosed embodiment, a non-transitory computer readable medium having computer readable program code embodied therein for transporting wire components that, when executed, includes pneumatically transporting a wire component from a transport source station to at least one transport destination station through an air-operated tube network connecting the transport source station and the at least one transport destination station based on a wire bundle assembly program.

BRIEF DESCRIPTION OF THE DRAWINGS

Figure 1:
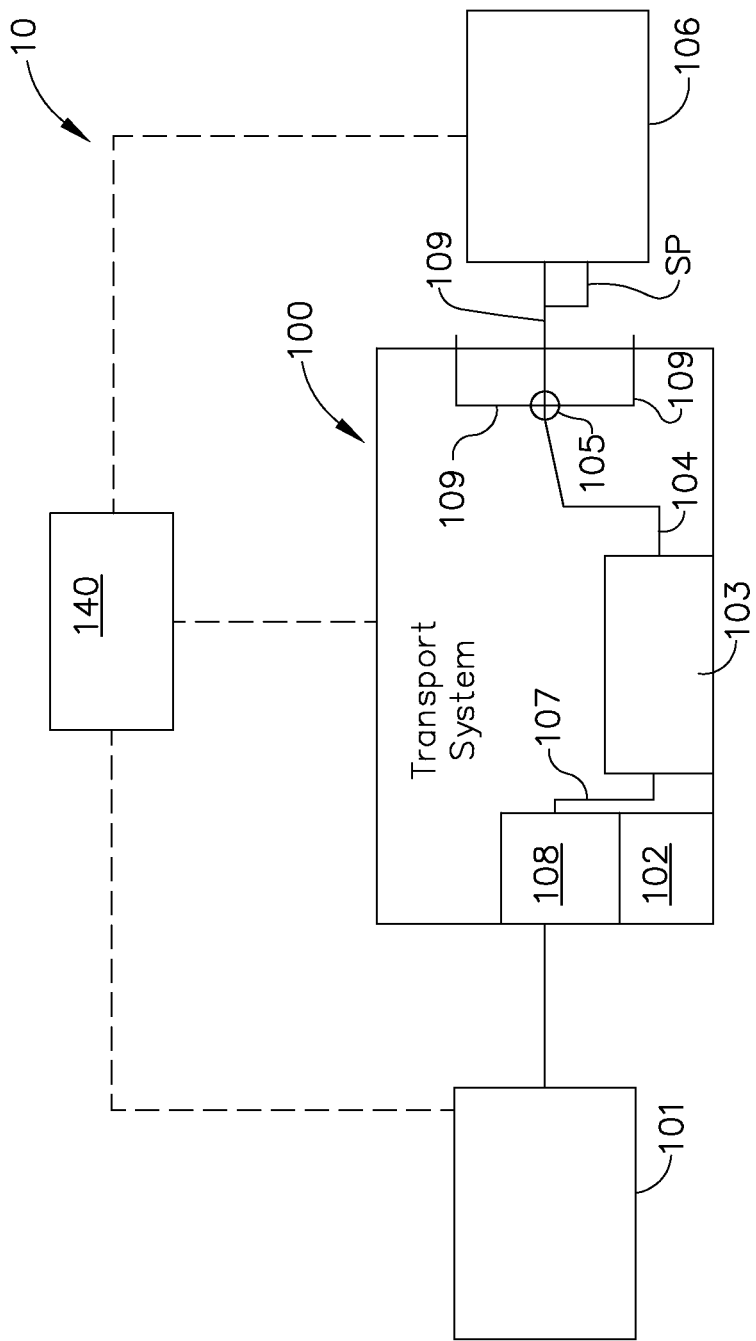
Figure 2A:
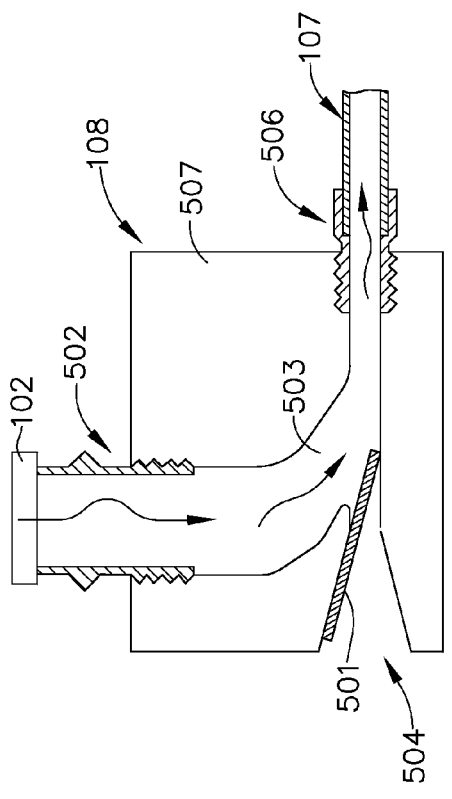
Figure 2B:
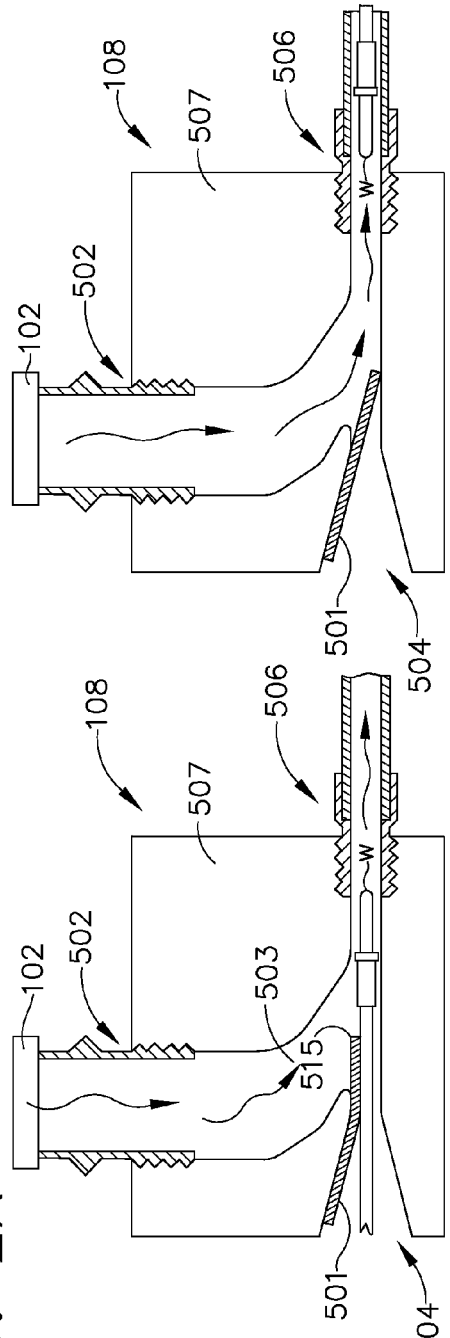
Figure 2C:
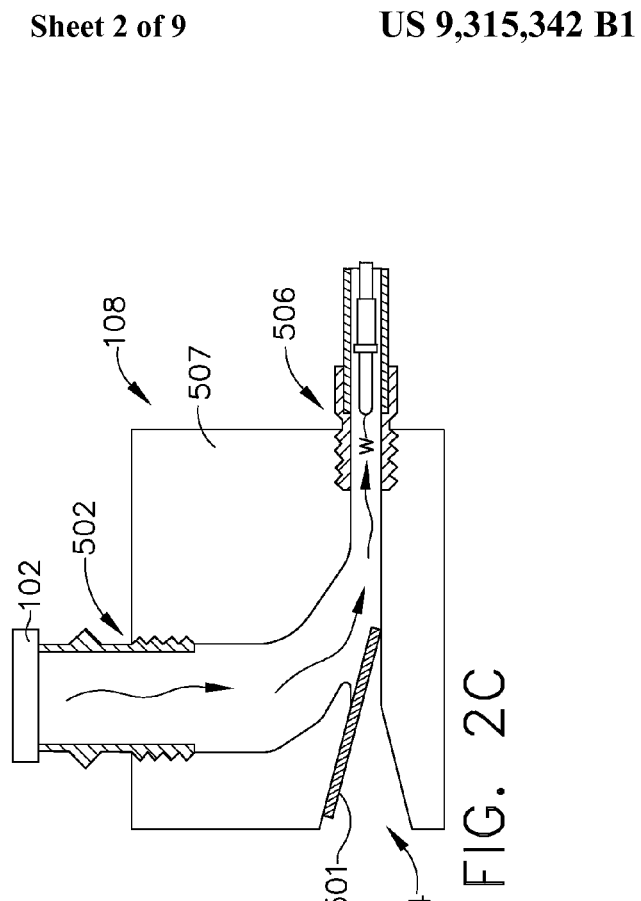
Figure 3:
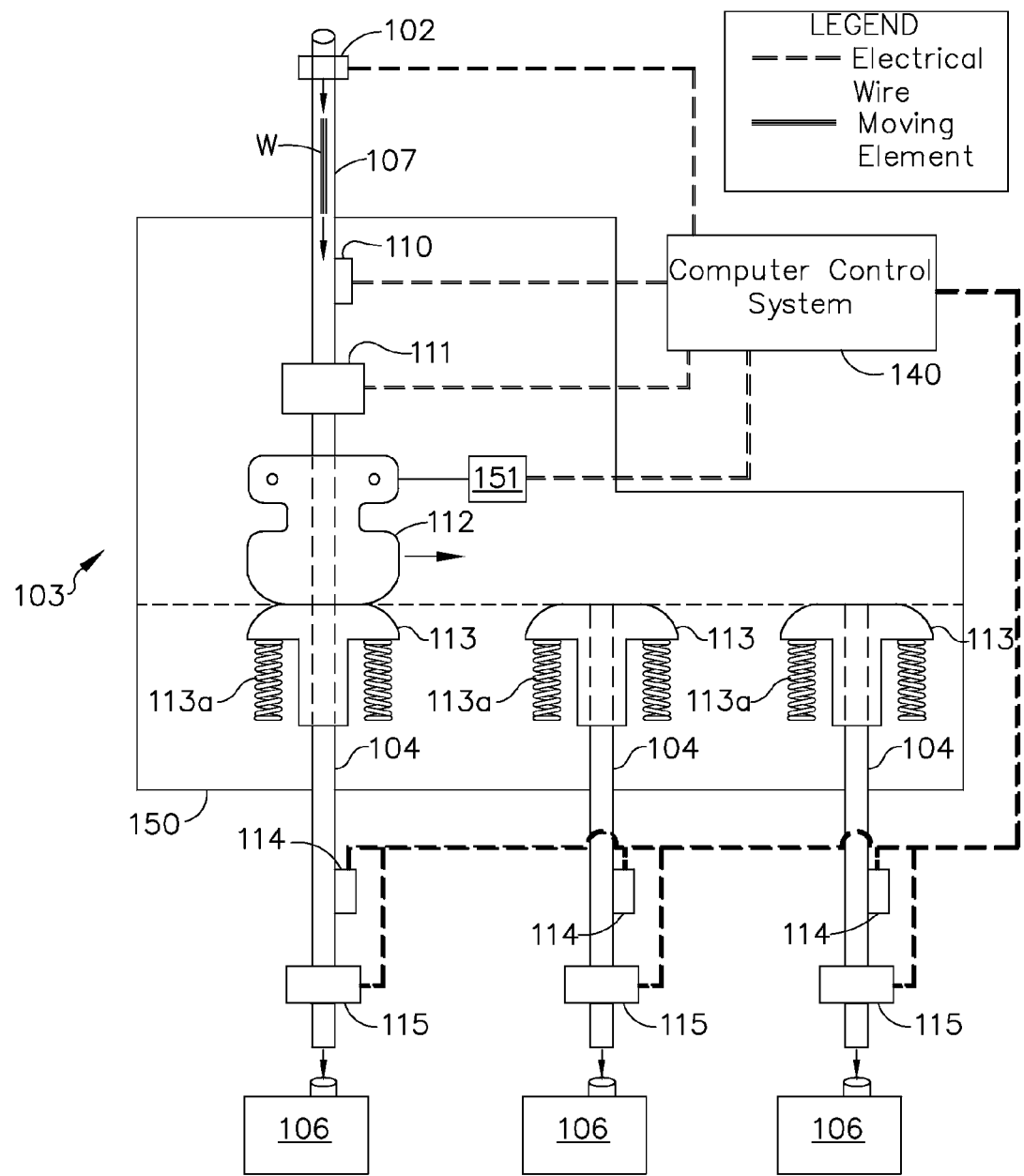
Figure 4:
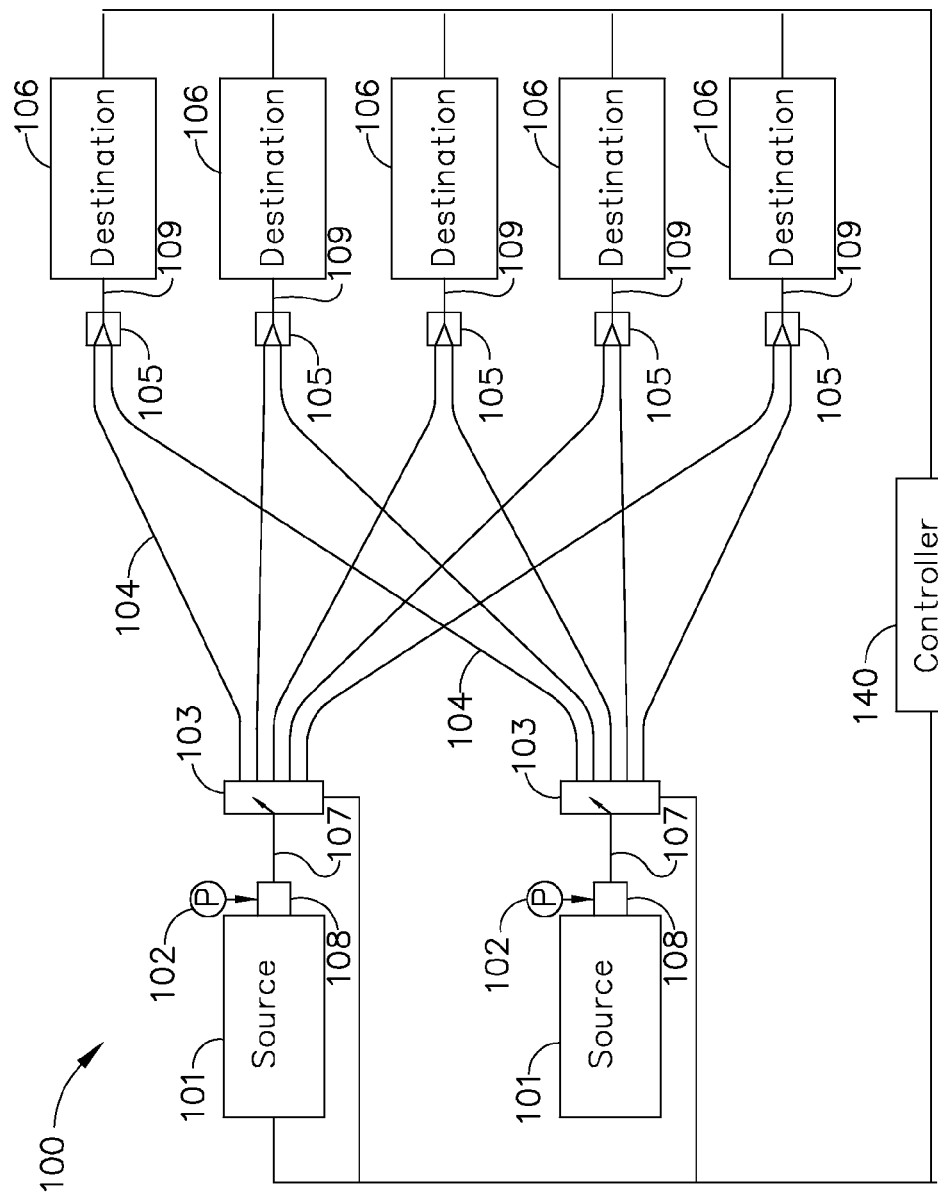
Figure 5:
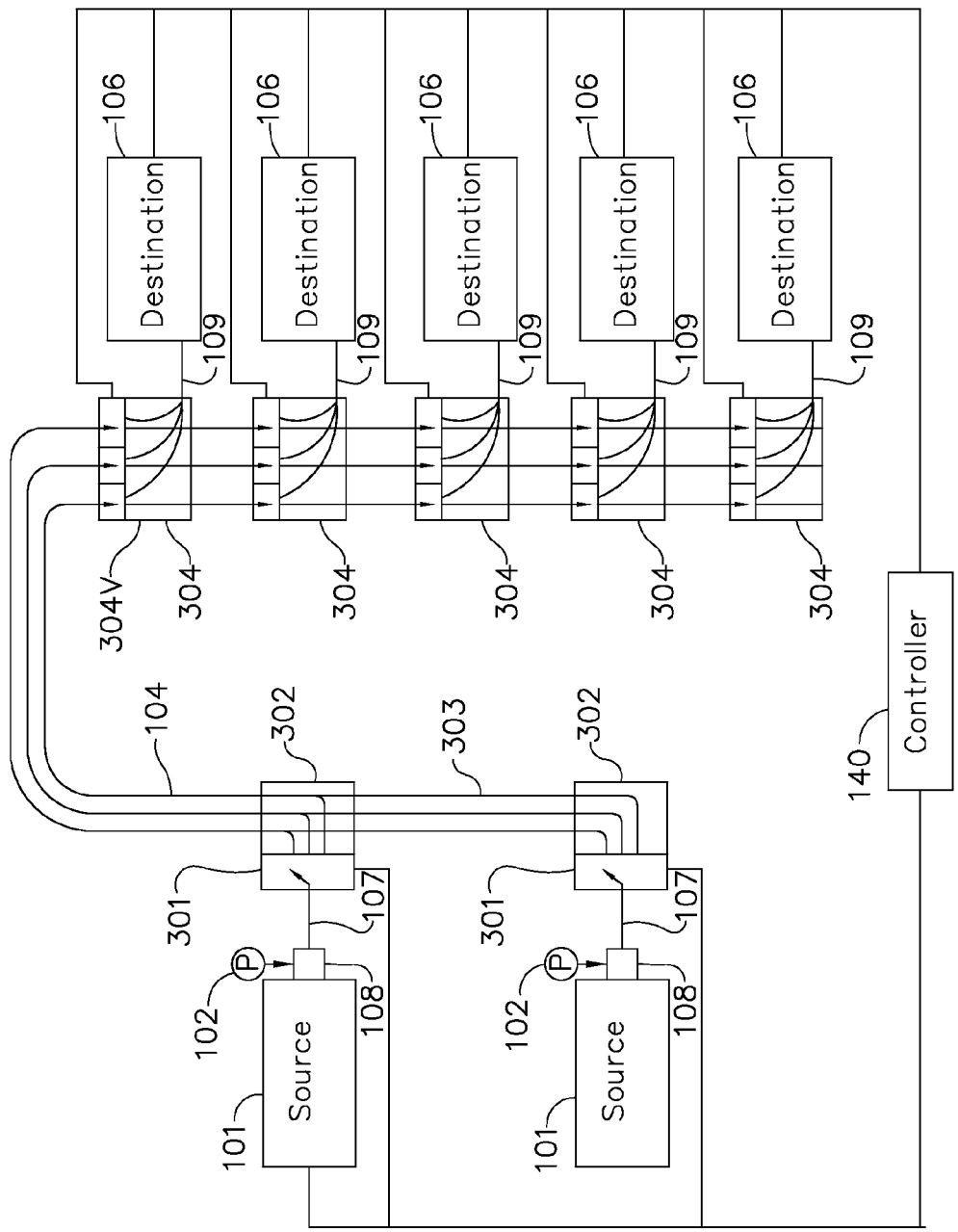
Figure 6:
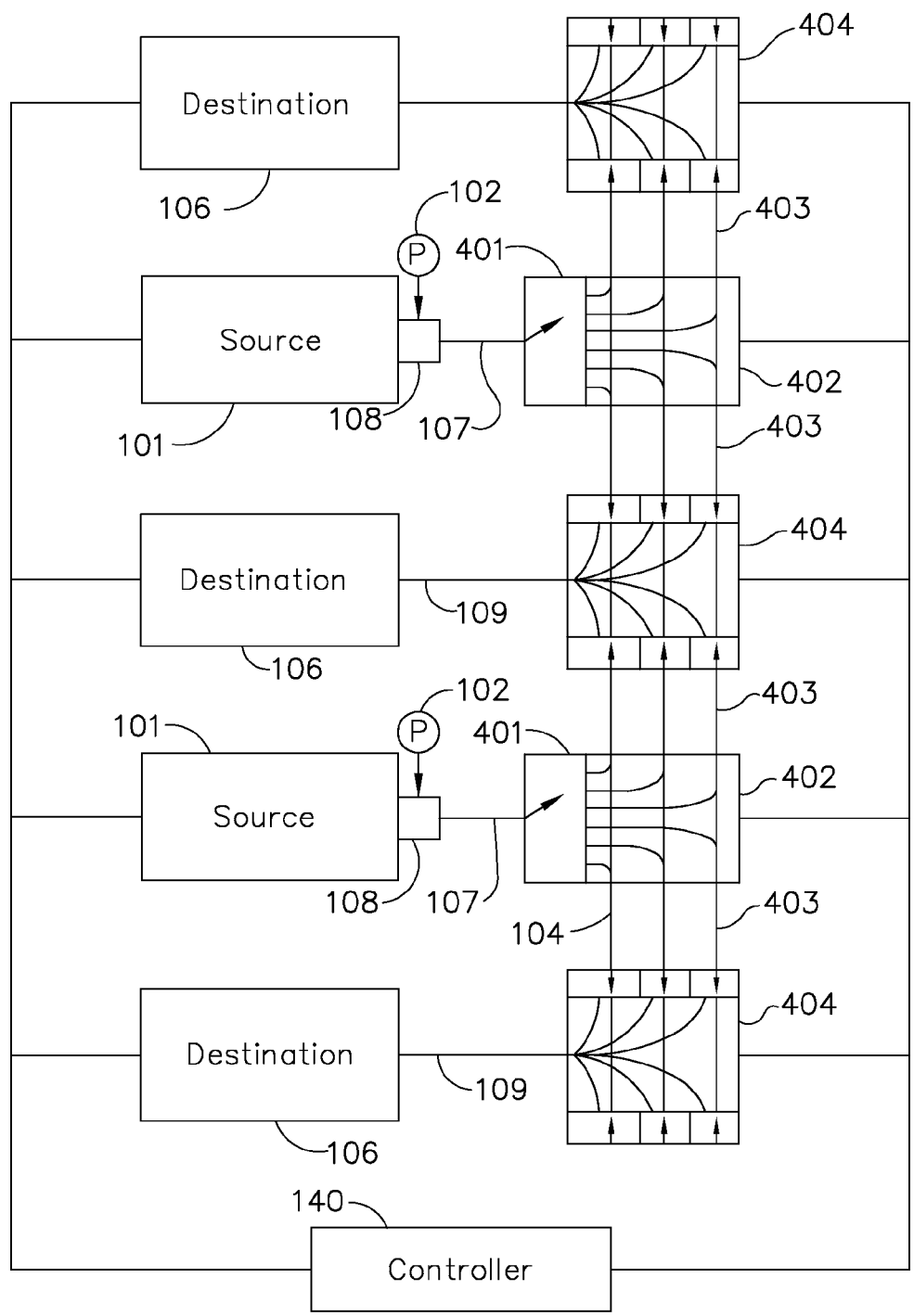
Figure 7:
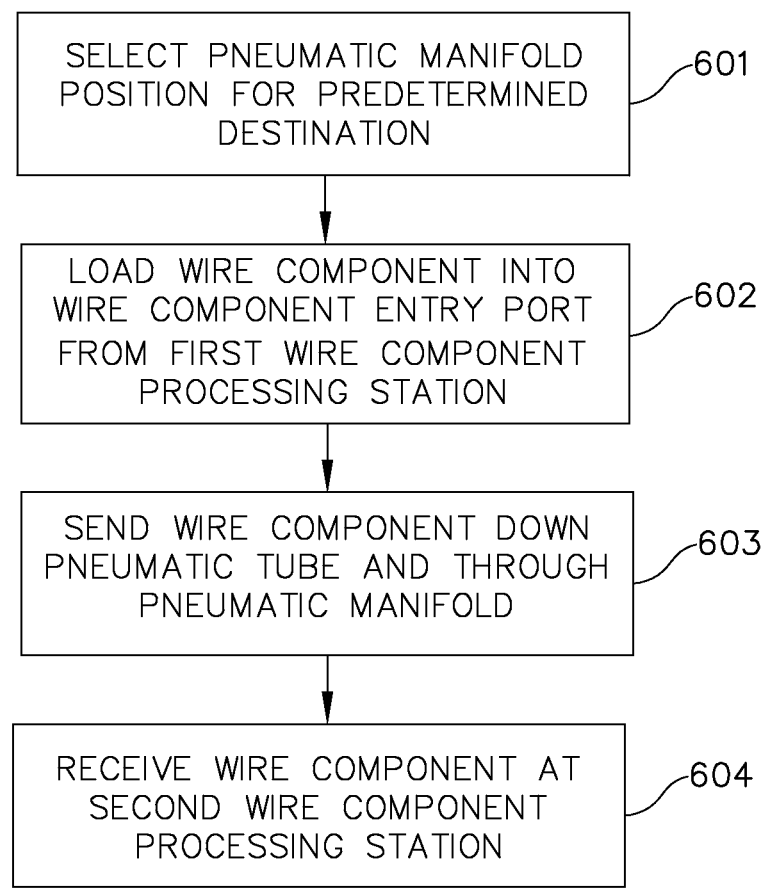
Figure 8:
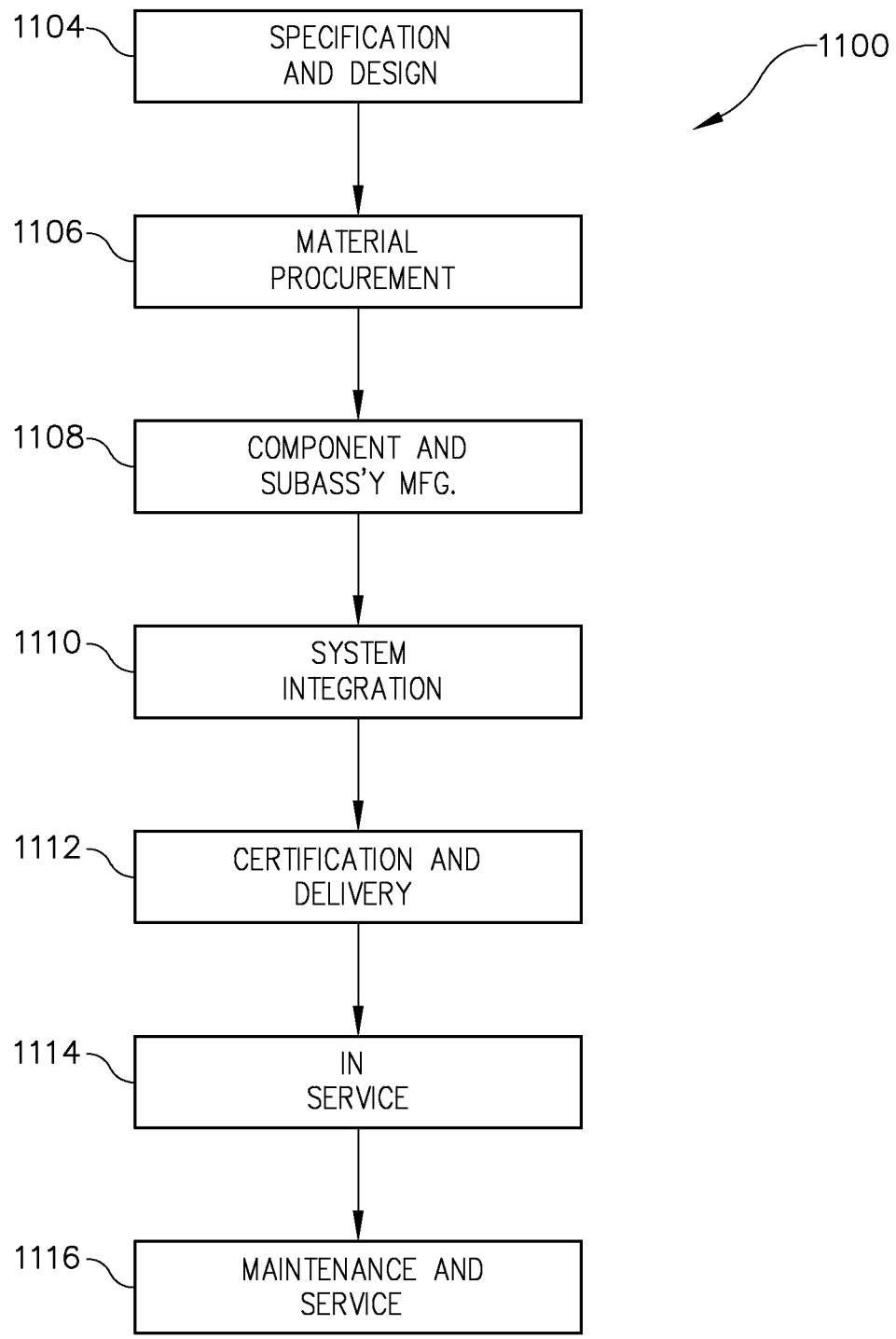
Figure 9:
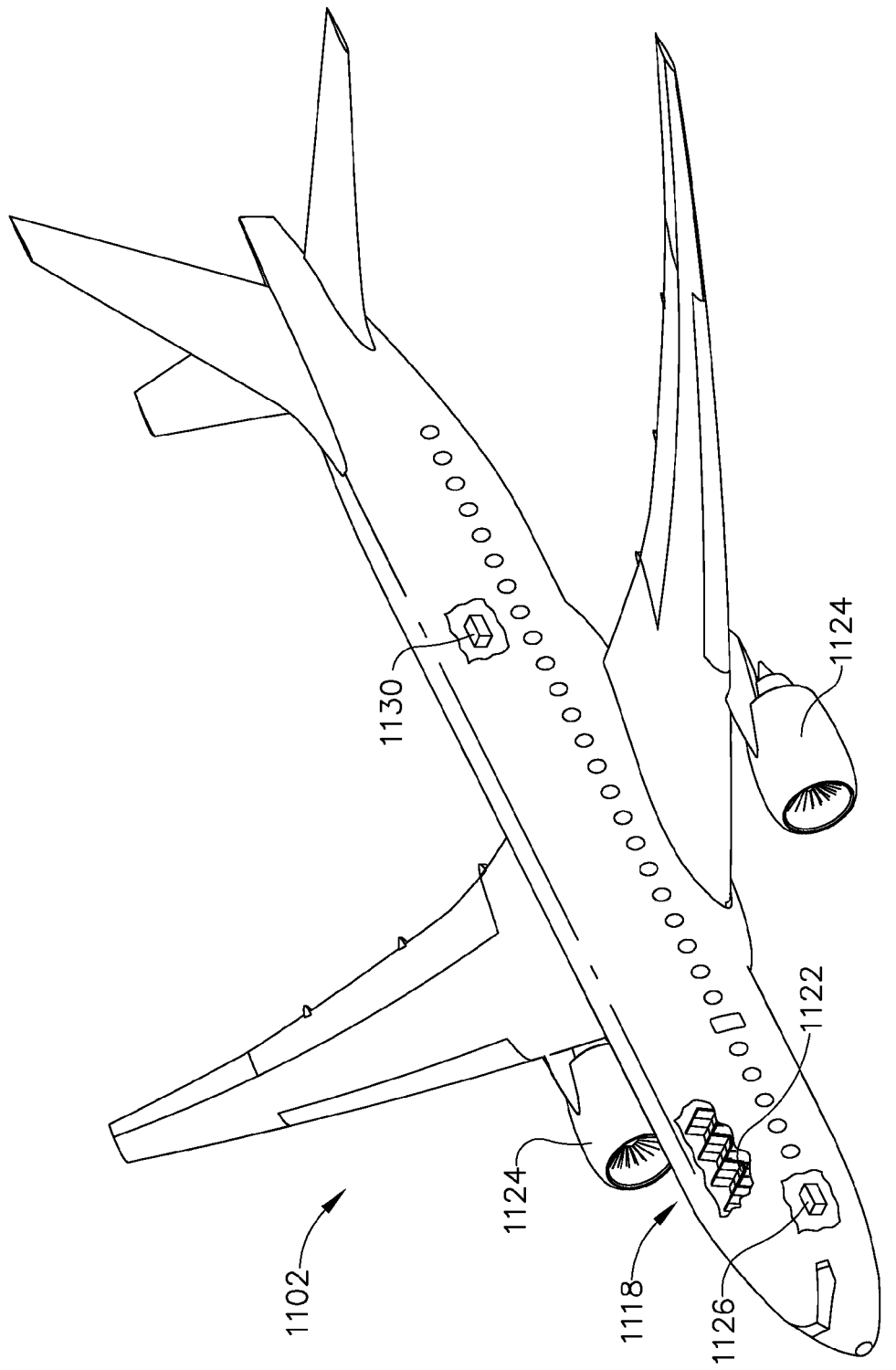

Having thus described examples of the disclosure in general terms, reference will now be made to the accompanying drawings, which are not necessarily drawn to scale, and wherein like reference characters designate the same or similar parts throughout the several views, and wherein:

FIG. 1 is an exemplary block diagram of a wire component transport system according to aspects of the present disclosure;

FIG. 2A-C are exemplary cross-sectional diagrams illustrating a wire component entry port of the wire component transport system according to aspects of the present disclosure;

FIG. 3 is an exemplary cross-sectional diagram of a manifold of the wire component transport system according to aspects of the present disclosure;

FIG. 4 is an exemplary schematic diagram illustrating an aspect of the wire component transport system according to aspects of the present disclosure;

FIG. 5 is an exemplary schematic diagram illustrating an aspect of the wire component transport system according to aspects of the present disclosure;

FIG. 6 is an exemplary schematic diagram illustrating an aspect of the wire component transport system according to aspects of the present disclosure;

FIG. 7 is a flow diagram according to aspects of the present disclosure;

FIG. 8 is a flow diagram of aircraft production and service methodology in accordance with aspects of the present disclosure;

FIG. 9 is a schematic illustration of an aircraft in accordance with aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring now to FIG. 1, a processing system 10 according to an aspect of the present disclosure is shown. The processing system 10 is a system for the processing of wire components where the wire components may include wires, wire assemblies, wire processing components and/or wire assembly components such as contacts, seal plugs, heat-shrink "pigtails" or any other suitable wire assembly components (generally referred to as wire components w). In one aspect, the processing system 10 includes a first wire component processing station 101, a second wire component processing station 106 and a wire component transport system 100 in communication with both the first and second processing stations 101, 106. While only two wire component processing stations are illustrated in FIG. 1, it should be understood that the processing system 10 includes any suitable number of wire component processing stations connected to each other by the wire component transport system 100. The wire component transport system 100 enables wire components (not shown in FIG. 1) to be transported between the first wire component processing station 101 and second wire component processing station 106. The processing system 10 further includes a controller 140 which is communicably connected to the first wire component processing station 101, second wire component processing station 106 and the wire component transport system 100. The controller 140 controls various aspects of the operations of the first wire component processing station 101, second wire component processing station 106 and wire component transport system 100 as described herein. The controller 140 may be, for instance, a general purpose computer system or server, but in other aspects of the disclosed embodiment, may be a dedicated controller system configured to control any aspects of manufacturing, transport and/or processing of wire components w within the processing system 10.

The first wire component processing station 101 of the processing system 10 is a station which can perform a processing task on wire component. For example, the first wire component processing station 101 may be configured to perform one or more of: draw a wire component w (for example, a segment of wire) from a collection of components (for example, a spool of wire); mark the wire component with information such as a wire component bundle or batch number, wire component number and wire component gauge; or process the wire component to a predetermined state (such as cut to length, assemble connectors to a wire segment, etc.). In the case of wire processing, the first wire component processing station 101 may also strip one or more ends of a wire segment and/or crimp an electrical contact onto one or both ends of the wire segment. However, in other aspects, the first wire component processing station 101 performs any suitable processing tasks on a wire component. Some or all of the tasks performed by the first wire component processing station 101 may therefore be controlled by the controller 140.

The wire component transport system 100 further includes a wire component entry port 108, a pneumatic tube 107, a fluid flow source such as a pressurized air supply 102, a manifold 103 and a pneumatic tube 104. In other aspects, the wire component transport system 100 also includes a junction 105 and pneumatic tubes 109. The first wire component processing station 101 is communicably connected to the second wire component transport station 106 via the wire component transport system 100 through the wire entry port 108. The wire component entry port 108 is disposed adjacent, for example, a first end of the transport tubes (e.g. collectively tubes 107, 104 and 109 described below are referred to a transport tube network which form a continuous transport path between source and destination stations) and is configured to accept a wire component w from the first wire component processing station 101 and/or any other wire component processing stations via automated or manual transfer. For example, the wire component w from the wire component processing station 101 may be automatically loaded into a first end of, for example, the transport tubes through the wire component entry port 108 through any suitable automated mechanism such as a robot, conveyor or other automation. However, in other aspects of the disclosed embodiment, the wire component entry port 108 may be loaded with a wire component w by any other suitable method, including, for example, manual loading of the wire component entry port 108 (e.g. a worker may manually remove a wire component from the first processing station 101 and load the wire component w into the wire component entry port 108).

Referring now to FIGS. 2A-C, schematic views illustrating the operation of the wire component entry port 108 are shown. The wire component entry port 108 is configured to receive a wire component w from the first wire component processing station 101 through an inlet 504 and propel the wire component w through the pneumatic tube 107 via a flow of fluid from, for example, the pressurized (positive) air supply 102. The wire component entry port 108 shown in FIGS. 2A-C has a frame 507 which defines an air channel 503 as well as the inlet 504. In one aspect one or more of the transport tubes of the wire component transport system 101 has a fluid flow source at one or more ends of the transport tubes. For example, the wire component entry port 108 has a pneumatic fitting 502 that is coupled to the frame 507 and configured to communicably couple the air channel 503 to the pressurized air supply 102. As may be seen in FIGS. 2A-C, the pneumatic fitting 502 may have threading or other suitable features to facilitate a substantially air-tight seal with the frame 507 of the wire component entry port 108. The pressurized air supply 102 may be, for example, a shop air source, however, in other aspects of the disclosed embodiment, the fluid flow source, such as the pressurized air supply 102 may be any suitable source of pressurized gas (e.g., a positive air flow source) or, as described below, a vacuum source (e.g., a negative air flow source) that provides a pressure differential within pneumatic tubes of the wire component transport system 100. The air channel 503 is further in communication with a compression fitting 506 (or any other suitable fitting) configured to couple the wire component entry port 108 to the pneumatic transport tube 107. As may be seen in FIGS. 2A-C, the air channel 503 may be relatively wide where the air channel 503 is coupled to the pneumatic fitting 502 and may gradually narrow or taper where the air channel 503 is coupled to the compression fitting 506 to provide for greater pressure from the pressurized air supply 102 and so that a cross section of the air channel 503 is substantially the same as the cross section of the tube 107. As may be realized, the air channel 503 and pneumatic tube 107 are sized so that there is suitable clearance for the wire component w to pass while allowing some pressurized gas flow to pass over the wire component w (e.g. there is some leakage between the wire component w and the pneumatic tube 107 and air channel 503). In other aspects, there may not be any fluid leakage past the wire component w during transport within the air channel 503 and/or pneumatic tube 107. As with the pneumatic fitting 502, the compression fitting 506 may have suitable features to facilitate a substantially air-tight seal as it is coupled to the frame 507 of the wire component entry port 108. The pneumatic tube 107 may be any suitable flexible or rigid tube which may allow for the transport of a wire component w through the length of the pneumatic tube 107. The inlet 504 of the wire entry port 108 provides another opening to the air channel 503 that is substantially closed by a valve or closure member 501, which is moveable between open and closed positions to allow for the introduction of wire components w into or through the inlet 504. In one aspect, the valve member 501 has any suitable configuration for opening and closing the inlet 504 such as, for example, a hinged coupling to the frame 507 or a non-hinged coupling to the frame 507. The valve member 501 may be made of plastic, metal, composite, rubber, silicone or any suitable rigid, resilient or flexible material. The valve member 501 may be, for example, configured to be biased in a closed position with a spring or other biasing member. In other aspects, the valve member 501 could be a flapper type member that bends and flexes as a wire component w is introduced. In yet other aspects, the valve member 501 could extend into the air channel 503 and is held closed by the air flow within the air channel 503. The valve member 501 opens when the wire component w pushes, presses or otherwise engages the valve member 501 for entry into the air channel 503 and closes after passage of the wire component w through the inlet 504. The inlet 504 is positioned on the frame 507 so that the wire component w is introduced through the inlet 504 into the narrower portion of air channel 503. As the wire component w is introduced into the inlet 504, the valve member 501 yields to open the inlet 504 and the wire component w is guided toward the compression fitting 506 and pneumatic tube 107 by the valve member 501 and/or the contours (e.g. the internal walls) of the air channel 503. Referring now to FIG. 2C, after the wire component w enters the opening of the compression fitting 506 and pneumatic tube 107, the flow of air from the pressurized air supply 102 passing over and around the wire component w effects movement of the wire component w through the transport tubes. It is noted that the wire component w is uncontained and, as such, is not placed into a transport container during transport. Thus, in one aspect the flow of air flows around and impinges directly on one or more surfaces of the wire component w to propel (e.g. push or pull) the wire component w through the wire component transport system 100. It should be realized that in other aspects of the disclosed embodiment, the pressurized air supply 102 may be replaced by any other suitable device that generates a flow of air (or pressure differential) through the wire component transport system 100. For example, in one aspect of the disclosed embodiment, a vacuum source may be used to draw the wire component w through the pneumatic tube 107. In yet other aspects, there may be devices for providing pneumatic pressure/flow which effects bi-directional movement of the wire component w through the pneumatic tubes 107, for example, a pressurized air source located at opposite ends of the wire component transport system 100 for bi-directionally providing air flow through the pneumatic tubes or a source configured to alternate between a vacuum source and a pressurized air source. In yet other aspects, the pressurized gas flow may effect movement of the wire component w as it travels through the pneumatic tube 107 in any other suitable manner. For example, the pressurized gas flow may provide lubrication within the transport tube where the wire component w is propelled through the transport tubes in any suitable manner such as by magnets.

Referring again to FIG. 1, the wire component entry port 108 is connected to a manifold 103 via the pneumatic tube 107. Referring now to FIG. 3, a schematic view of the manifold 103 is shown in accordance with aspects of the present disclosure. The manifold 103 is configured to selectively route the wire component w from a source location (e.g. such as the first wire component processing station 101) to a predetermined destination such as the second wire component processing station 106 disposed adjacent a second end of the transport tube network (e.g. which form a continuous transport path between the source and destination stations). The manifold 103 has a manifold frame 150 to which a manifold head 112 is moveably mounted and to which one or more manifold receivers 113 are mounted. The manifold head 112 is communicably coupled to the pneumatic tube 107. Arranged along the pneumatic tube 107 are one or more sensors 110 and wire component brake(s) 111. The sensor 110 is any suitable sensor configured to detect the presence or absence of a wire component w as it traverses within the pneumatic tube 107, such as, for example, one or more inductive proximity sensors. However, in alternate aspects, the sensor 110 may be any suitable sensor, including, for example, a sensor configured to read indicia information on the wire component w and/or a sensor configured for detecting wire component type and/or wire component destination. The sensor 110 is in communication with the controller 140 and is configured to signal the controller 140 whenever the wire component w and any information associated with wire component w is detected (or not detected). In other aspects, the sensor(s) 110 are disposed along the pneumatic tubes 107, 104, 109 to detect the location of a wire component w within the wire component transport system 100. In this case, the sensor 110 is any suitable sensor configured to detect a wire component such as an RFID sensor, inductive proximity sensor, a light beam sensor or any other suitable sensor. The wire component brake(s) 111 is/are arranged along any portion of the length of the pneumatic tube 107. The wire component brake 111 is configured to stop or otherwise slow a traveling velocity or speed of the wire component w within the pneumatic tube 107. In one aspect of the disclosed embodiment, the wire component brake 111 may function electromagnetically (i.e. by means of an electromagnet which prevents the wire component w from traveling beyond a predetermined location within the pneumatic tube 107). However, in other aspects, the wire component brake 111 may be pneumatically operated, such as by a vent or valve that redirects the flow of air so that the wire component w is no longer propelled through the pneumatic tube 107 by the fluid flow source (i.e. the pressurized air supply 102). In yet other aspects, the wire component brake 111 may operate on any suitable principle which prevents the wire component w from traversing through the pneumatic tube 107. The wire component brake 111 is also communicably connected to the controller 140 and is configured to be controlled by the controller 140 based on, for example, signals obtained from the sensor 110.

The manifold head 112 is mounted on the frame 150 of the manifold 103 so as to be selectively moveable between multiple manifold outputs such as, for example, manifold receivers 113. For example, the manifold head 112 is repositioned to selectively couple with one of the pneumatic tubes 104 via a respective manifold receiver 113. The manifold head 112 may be repositioned by an actuator 151 such as a servo, motor, pneumatic actuators, magnetic actuators or any other suitable actuating device. The actuator 151 is under the control of the controller 140 which commands the actuator 151 to move the manifold head 112 to a predetermined manifold receiver 113 based on a predetermined destination of the wire component w. The manifold head 112 may have a tapered shape which may facilitate the alignment of the selective coupling of the manifold head 112 and manifold receiver 113. The manifold receiver 113 may selectively mate with the manifold head 112 so that the pneumatic tube 104 is aligned with the pneumatic tube 107 to allow for the wire component w to pass between the pneumatic tube 107 and pneumatic tube 104. The manifold receiver 113 may have resilient members 113a which bias the manifold receiver 113 against the manifold head 112 to ensure that a seal is created when the manifold receiver 113 and manifold head 112 are coupled so that the wire component w may pass from the pneumatic tube 107 to the pneumatic tube 104 without substantial loss of air pressure/flow.

Referring still to FIG. 3, when the pneumatic tube 107 is aligned with the pneumatic tube 104, the wire component w may be propelled by the flow of air from the pressurized air supply 102 through the pneumatic tube 107 and into the pneumatic tube 104. The pneumatic tube 104 may be substantially similar in construction and form as pneumatic tube 107. Each of the pneumatic tubes 104 in the manifold 103 couples the manifold head 112 (and hence pneumatic tube 107 and the wire component source station, such as inlet 108) to a respective destination (such as a second wire component processing station 106 or other terminus of the wire component transport system 100, such as an end of the pneumatic tube 104 and/or a mechanism SP coupled to the second end of one or more tubes of the transport system and being configured to coil the wire component upon arrival) for the wire component w. The pneumatic tube 104 may also have sensors 114 and wire component brake 115 (similar to those described above), each respectively controlled by the controller 140 in a manner substantially similar to that of sensor 110 and wire component brake 111 coupled to pneumatic tube 107. The wire component brake 115 (in response to a detection of the wire component w by the sensor(s) 114) stops or slows down the travel velocity or speed of the wire component w so that the wire component w can be withdrawn from the pneumatic tube 104. When the wire component w reaches the second wire processing station 106 (e.g. the destination), in one or more aspect, withdrawal of the wire component w from the pneumatic tube 104 is effected in any suitable manner such as manually or by automated machinery. In other aspects, the velocity of the wire component is slowed by the brake by any suitable amount so that the flow of air ejects the wire component w from the pneumatic tube 104 into a holding location of the second wire component processing station 106. In still other aspects, the flow of air at least partially ejects the wire component w from the pneumatic tube 104 so that the wire component w is gripped manually or by any suitable automation. After the wire component w is withdrawn from the pneumatic tube 104, the wire component w is placed in the second wire component processing station 106 for further processing. The second wire component processing station 106 may be used to perform one or more of: marking a wire component w with information such as wire component bundle/batch number, wire component number and wire component gauge information; processing a wire component w to a predetermined state (such as cut to length, assemble connectors to a wire segment, etc.). In the case of wire component processing, this may also include stripping one or more ends of a wire; crimping an electrical contact onto one or both ends of the wire; assembly of one or both ends of the wire into connectors; routing wire onto a wire bundle assembly form board; routing the wire through a conduit; grouping wire with other wire segments; tying groups of wire segments into a bundle; and/or any other suitable wire preparation tasks.

It should be realized that the controller 140 can receive signals from the sensors 110 and 114 positioned along the pneumatic tubes 107 and 104. The signals received from sensors 110 and 114 may facilitate the timing of the movement of the wire component w within the wire component transport system 100. For example, the controller 140 may determine when to transport a wire component w from the first wire processing station 101 to the second wire component processing station 106 based on the detected presence or absence of a wire component w by sensors 110 and 114. This may be realized in the form of just-in-time manufacturing techniques. For example, when a wire component processing task is completed (and/or a wire component is removed from the wire component transport system 100) at a second wire component processing station 106, the completion of the wire component processing task (and/or a wire component is removed from the component transport system 100) may trigger wire component preparation tasks in the first wire component processing station 101. The sensor 114 may detect the presence of wire component w arriving at the second wire component processing station 106 via the pneumatic tube 104. When the presence of the wire component w is no longer detected by the sensor 114 (i.e. the wire component w has been withdrawn or otherwise been placed into the second wire component processing station 106), the sensor 114 may signal the controller 140 to initiate the first wire component processing station 101 to begin preparation of a next wire component w or to send the next wire component w to the pneumatic tube 107 for transport. In another aspect of the disclosed embodiment, the signals from the sensors 110 and 114 may also effect the actuation of the manifold. The sensors 110 and 114 may be configured to read indicia information marked on a wire component w (for example, information marked by the first wire component processing station 101). Sensors 110 and 114 may include optical scanners, RFID scanners, or any other suitable scanning technology capable of reading information from the wire component w. The indicia information on the wire component w may include indications of the predetermined destination and source of the wire component w. By detecting the destination and/or source information marked on the wire component w, the controller 140 dynamically effect actuation of the manifold head 112 with the actuator 151 based on the signals from sensors 110 and 114, to selectively couple with a predetermined manifold receiver 113 and pneumatic tube 104 which corresponds to the predetermined destination of the wire component w. Thus, the wire component w may be dynamically routed from the first wire component processing station 101 to a predetermined second wire component processing station 106 as the wire component w arrives at the manifold 103. In yet other aspects, the manifold 103 may be actuated at any suitable time to effect transport of a wire component w between a first wire component processing station 101 and a second wire processing station 106. For example, the manifold 103 may be positioned ahead of time (e.g. prior to sending wire component w through the wire transport system 100) by a controller 140 to allow for direct transport of the wire component w through the pneumatic tube 107, manifold head 112, manifold receiver 113 and pneumatic tube 104 to the second wire component processing station 106. By selectively coupling the manifold head 112 and the predetermined manifold receiver 113 ahead of time, the wire component w may be transported directly between the first wire component processing station 101 and the second wire component processing station 106 without any stoppage. However, in other aspects, routing of the manifold head 112 may occur after the wire component w enters the wire component transport system 100. For example, as the wire component w is traveling through the pneumatic tube 107, the wire component w may be stopped by the wire component brake 111. As the wire component w is stopped by the wire component brake 111, the controller 140 may actuate the manifold head 112 to selectively couple to a predetermined manifold receiver 113 corresponding to a predetermined second wire component processing station 106. After the manifold head 112 is selectively coupled to the predetermined manifold receiver 113, the wire component w may be released by the wire component brake 111 and sent to the predetermined second wire component processing station 106. In other aspects, the wire component brake 111 may be a device for relieving pneumatic pressure before the end of the pneumatic tubes 107 and 104. This may be achieved by, for example, vents or valves which allows the flow of fluid to escape the pneumatic tubes 107 and 104. This relieving of pneumatic pressure may allow the wire component w to complete its movement through one or more of the pneumatic tubes 107, 104, 109 substantially by the gravity and/or by the momentum of the wire component w and come to rest at a predetermined location of the wire component transport system 100 such as a terminus of one of the tubes (e.g. manifold 103, end of a tube, mechanism SP, etc.). In yet other aspects of the disclosed embodiment, the wire component transport system 100 may accommodate multiple wire components w being transported within the system at any given time. There may be additional fluid flow sources disposed at the manifold 103 so that when the pneumatic tube 107 is disconnected from the pneumatic tube 104 the wire component w is traveling through, the wire component w continues to be propelled through the pneumatic tube 104 by the fluid flow source originating at the manifold 103 (or downstream of the manifold 103 in the case of a vacuum fluid flow source). In other aspects, there may be any suitable number of fluid flow sources arranged in any suitable configuration within the wire component transport system 100 to provide air flow to propel any number of wire components w through the different pneumatic tubes of the wire component transport system 100. As noted above, the controller 140 may detect signals from sensors 110 and 114 to dynamically route each wire component w to its predetermined destination as each wire component w arrives at the manifold 103.

It should be realized that the processing system 10 may be arranged to have multiple destinations for a common source (that is, multiple second wire component processing stations 106 may exist for a common first wire component processing station 101). It should also be realized that multiple sources within the processing system 10 may exist for a common destination (i.e. multiple first wire component processing stations 101 may exist for a common second wire component processing station 106). In other aspects, there may be multiple destinations for multiple sources.

For example, referring again to FIG. 1, after the wire component w is transported through the manifold 103, the wire component w is then sent through pneumatic tube 104 to a predetermined destination (e.g. second wire component processing station 106). In one aspect, the pneumatic tube 104 may be sent through a junction 105. The junction 105 may allow for pneumatic tube 104 to be joined to a multiple pneumatic tubes 109. In other aspects, multiple pneumatic tubes 104 may be joined to multiple pneumatic tubes 109. It should be understood that the junction 105 allows for multiple first wire component processing stations 101 to have common access to a common second wire component processing station 106, a common first wire component processing station 101 to have access to multiple second wire component processing stations 106 and/or multiple first wire component processing stations 101 to have access to multiple second wire component processing stations 106. It should also be understood that the junction 105 is a passive junction, however, in other aspects, the junction 105 includes one or more air control valves that are controlled by the controller 140 to selectively route a wire component w to a predetermined destination as will be described below. The pneumatic tube 109 then terminates at a second wire component processing station 106. It should be understood the wire component w received at the second wire component processing station 106 may be automatically unloaded from the pneumatic tube 109 through any suitable automated mechanism such as a robot, conveyor or other automation. In alternate aspects, the wire component w may be unloaded through any other suitable manner, including, for example, being manually unloaded from the pneumatic tube 109 by a worker. In yet other aspects, as noted above, there is a mechanism SP coupled to the end of the pneumatic tube 109 terminating at the second wire processing station 106 configured to coil wire components w upon arrival at the second wire component processing station 106.

Referring now to FIG. 4, a pneumatic tube network is illustrated. The pneumatic tube network shown in FIG. 4 is a network where there is a dedicated pneumatic tube 104 connecting each first wire component processing station 101 (and its respective manifold 103) and each second wire component processing station 106. The pneumatic tube network shown in FIG. 4 forms a continuous transport path for a wire component w as it travels from a first wire component processing station 101 to a second wire component processing station 106. Each of the dedicated pneumatic tubes 104 in FIG. 4 leads to a junction 105 associated with each second wire component processing station 106. The junction 105 joins the dedicated pneumatic tube 104 from each first wire component processing station 101 to a pneumatic tube 109 which leads to the second wire component processing station 106. Each junction 105 is shown in FIG. 4 in the form of a Y-junction, joining pneumatic tubes from each of the first wire component processing station for transport to each second wire component processing station 106. In other aspects, for systems with more first wire component processing stations 101, the junction 105 may accept wire component w from any suitable number of first wire component processing stations 101 and have any suitable configuration.

Referring now to FIG. 5, another pneumatic tube network is shown in accordance with aspects of the present disclosure. Similar to the pneumatic tube network shown in FIG. 4, the pneumatic tube network shown in FIG. 5 also forms a continuous transport path for a wire component w. Where, in FIG.

4, the manifold 103 selects from one of several dedicated pneumatic tubes 104 corresponding to one of the second wire component processing stations 106, in FIG. 5, the manifold 301 selects from one of the pneumatic tubes of a "raceway" 303 of pneumatic tubes (e.g. the pneumatic tubes of the raceway 303 are common to each source and each destination and provide side-by-side wire component transport lanes in a manner similar to that of lanes of travel on a racetrack). For example, a wire component w sent through the manifold 301. The manifold 301 sends the wire component w to one of multiple pneumatic tubes within a junction 302. The junction 302 leads to the raceway 303 of pneumatic tubes which travels to each of the second wire processing stations 106. As a wire component w within each of the pneumatic tubes of the raceway 303 passes a predetermined second wire processing station 106, the wire component w is passed through a selection junction 304. The selection junction 304 is controlled by the controller 140 to determine whether the wire component w will continue along the raceway 303 or whether the wire component w will be routed to the predetermined second wire component processing station 106 coupled to the selection junction 304. In one aspect of the disclosed embodiment, as noted above, the selection junction 304 includes a set of air control valves 304V that are controlled by any suitable controller such as controller 140 to selectively redirect the wire component w to a predetermined second wire component processing station 106 at a predetermined output of the selection junction 304. For example, the valves 304V are controlled to either direct the wire component w to continue along a respective tube 104 of the raceway 303 or to exit the raceway tube 104 and travel along an exit tube 109 to a predetermined destination. The aspect shown in FIG. 5 greatly reduces the number of pneumatic tubes necessary for the wire transport system 100. By reducing the number of pneumatic tubes to a raceway 303, the aspect shown in FIG. 5 avoids a geometric increase of the number of pneumatic tubes with each additional second wire component processing station 106 and/or first wire component processing station 101 as complexity of the pneumatic tube network increases. Further, the multiple pneumatic tubes of the raceway 303 allow for substantially simultaneous transport of more than one wire component w between the first and second wire component processing stations 101, 106. Because the raceway is shared, multiple wire components w may be transported along the raceway 303 from the air flow of a common pressurized air supply 102.

Referring now to FIG. 6, another pneumatic tube network is shown in accordance with aspects of the present disclosure. Similar to the pneumatic tube network shown in FIG. 4, the pneumatic tube network shown in FIG. 6 forms a continuous transport path for a wire component w. The manifold 401 is substantially similar to the manifold 301. The manifold 401 may be configured to send the wire component w into a junction 402, which is configured to transfer a wire component w along two different directions along a raceway of transport tubes 403. In the aspect shown in FIG. 6, each pneumatic tube of a raceway 403 is configured to allow for wire component w to bi-directionally travel along the length of the raceway 403. As can be seen in FIG. 6, the manifold 401 may selectively output a wire component w to one of many tracks of the junction 402. The various tracks of the junction 402 allow for the wire component w to exit the junction 402 in any direction along the pneumatic tubes of raceway 403. The junction 402 is, in other words, configured to route the wire component w in different directions of the pneumatic tube within raceway 403. For example, the junction 402 effects bi-directional transfer of components w in a common tube and/or transport of wire components w in opposite directions in different tubes. The wire component w may be sent to a predetermined second wire component processing stations 106 more directly instead of having to potentially travel the length of entire raceway 403 as would be the case with the aspect shown in FIG. 5. When the wire component w reaches the selection junction 404, the controller 140 is configured to dynamically or otherwise route the wire component w to the predetermined second wire component processing station 106. In one aspect of the disclosed embodiment, the selection junction 404 includes a set of air control valves 304V in a manner similar to that described above to redirect the wire component w to a predetermined output of the selection junction 404 so as to be transported to a destination such as a second wire component processing station 106. By allowing for bidirectional travel within the raceway 403, the travel distance and transport time of a wire component w traveling from first wire component processing station 101 and second wire component processing station 106 may be reduced while allowing for the sources and destinations to be arranged substantially linearly.

It should be realized that in other aspects, the pneumatic networks illustrated in FIGS. 4-6 may also be generally bidirectional. For example, there may be a pressurized air supply 102 or a vacuum source arranged at both the first wire component processing station 101 and second wire component processing station 106. By having a pressurized air supply 102 or vacuum source arranged at both first wire component processing station 101 and second wire component processing station 106 (and/or at intermediate points such as the manifolds and/or junctions), a wire component w may bi-directionally travel back and forth between a first wire component processing station 101 and a second wire component processing station 106. Referring now to FIG. 7, a block diagram illustrating the operation of the processing system 10 is shown. At block 601, a manifold position for a predetermined second wire component processing station 106 is selected by the controller 140 and actuated on the manifold 103 in the manner described above. At block 602, the wire component w is loaded into the wire component entry port 108 from the first wire component processing station 101. At block 602, the wire component w is transported through the pneumatic tube 107 with pressurized gas, through the manifold 103 and through pneumatic tube 104. At block 604, the wire component w is received at the second wire component processing station 106.

It should be realized that in other aspects, the pneumatic networks illustrated in FIGS. 4-6 provide a means for every second wire component processing station 106 to have access to the resources of all first wire component processing stations 101. For example, a second wire component processing station 106 may be supplied with wire components w of a first type from one first wire component processing station 101 and may be supplied with wire components w of a second type from another first wire component processing station 101.

It should be realized that in other aspects, the pneumatic networks illustrated in FIGS. 4-6 provide a means for balancing or optimizing the total throughput of the manufacturing system by enabling any number of first wire component processing stations 101 to supply components to second component processing stations 106. For example, a higher capacity second wire component processing station 106 may be supplied with wire components w from more first wire component processing stations 101, whereas a lower capacity second wire component processing station 106 may be supplied with wire components w from fewer first wire component processing stations 101.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. It should be noted that the blocks of FIG. 7 may be performed in any suitable order. For instance, block 602 may be performed first and the block 601 performed second. This may be seen in an instance where the wire component w is stopped by wire component brakes 111 while the manifold 103 position is actuated. Additionally, in some aspects of the disclosure, not all operations described herein need be performed.

Examples of the disclosure may be described in the context of an aircraft manufacturing and service method 1100 as shown in FIG. 8 and an aircraft 1102 as shown in FIG. 9. Specifically, the processing system 10 described herein may be employed, for instance, in any stage of aircraft manufacturing. During pre-production, illustrative method 1100 may include specification and design 1104 of the aircraft 1102 and material procurement 1106. During production, component and subassembly manufacturing 1108 and system integration 1110 of the aircraft 1102 take place. The processing system 10 described herein may be employed as part of the component and subassembly manufacturing process 1108. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, the aircraft 1102 produced by the illustrative method 1100 may include an airframe 1118 with a plurality of high-level systems and an interior 1122. Examples of high-level systems include one or more of a propulsion system 1124, an electrical system 1126, a hydraulic system 1128, and an environmental system 1130. Examples of systems which may include electrical systems assembled using the processing system 10 may include propulsion system 1124, electrical system 1126, hydraulic system 1128 and environmental system 1130. Although an aerospace example is shown, the principles of the invention may be applied to other industries, such as the automotive and maritime industries.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

In accordance with one or more aspects of the disclosed embodiment, a system for transporting wire components during the assembly of wire bundles includes an air-operated tube network connecting a transport source station to a plurality of transport destination stations, the air-operated tube network comprising a junction coupled between the transport source station and the plurality of transport destination stations, and a system controller that includes a wire bundle assembly program, the system controller programmed to automatically transmit wire components from the source station to at least one of the transport destination stations based on the wire bundle assembly program.

In accordance with one or more aspects of the disclosed embodiment, the system further includes a junction coupled between the transport source station and the plurality of transport destination stations, the junction being controlled by the system controller.

In accordance with one or more aspects of the disclosed embodiment, the system further includes a manifold, where the system controller operates the at least one manifold to route the wire components from the transport source station to a predetermined transport destination station.

In accordance with one or more aspects of the disclosed embodiment, the system further comprises a set of air control valves configured to enable the wire components from the transport source station to be selectively routed to the predetermined transport destination station.

In accordance with one or more aspects of the disclosed embodiment, the system further includes at least one sensor configured to enable the system controller to control the set of air control valves to effect routing of the wire components through a predetermined route between the transport source station and the predetermined transport destination station.

In accordance with one or more aspects of the disclosed embodiment, the system further includes one or more sensors configured to determine a location of the wire components within the air-operated tube network.

In accordance with one or more aspects of the disclosed embodiment, the system further includes at least one sensor at one or more ends of the air-operated tube network configured to control pressurization of the air-operated tube network.

In accordance with one or more aspects of the disclosed embodiment, the system further includes at least one sensor at one or more ends of the air-operated tube network configured to signal the system controller to effect one or more wire component preparation steps at the transport source station.

In accordance with one or more aspects of the disclosed embodiment, the one or more wire component preparation steps includes at least one of informing the system controller of the status of an assembly process, initiating the assembly of the wire component or controlling when the next wire component may be routed into the air-operated tube network from the transport source station.

In accordance with one or more aspects of the disclosed embodiment, the system further comprises a mechanism coupled to one of the transport destination stations configured to coil the wire components upon arrival.

In accordance with one or more aspects of the disclosed embodiment, a method for transporting wire components includes pneumatically transporting a wire component from a transport source station to at least one transport destination station through an air-operated tube network connecting the transport source station and the at least one transport destination station based on a wire bundle assembly program.

In accordance with one or more aspects of the disclosed embodiment, the method further comprises performing a first wire component preparation task with the transport source station where the first wire component preparation task includes at least one of wire component cutting, wire component marking, component stripping, or crimping of electrical contacts onto the end of the wire component.

In accordance with one or more aspects of the disclosed embodiment, the method further comprises performing a second wire component preparation task with the at least one transport destination station where the second wire component preparation task includes at least one of wire component cutting, wire component marking, wire component stripping, crimping electrical contacts onto the end of the wire component, forming a wire bundle, tying a wire component bundle or coiling a wire component.

In accordance with one or more aspects of the disclosed embodiment, the method further comprises providing a positive fluid flow within the air-operated tube network with a pressurized fluid flow source during the pneumatic transportation of the wire component from the transport source station to the at least one transport destination station.

In accordance with one or more aspects of the disclosed embodiment, the method further comprises providing a negative fluid flow within the air-operated tube network with a vacuum fluid flow source during the pneumatic transportation of the wire component from the transport source station to the at least one transport destination station.

In accordance with one or more aspects of the disclosed embodiment, the method further comprises redirecting the wire component from the transport source station to the at least one transport destination station through a manifold configured to redirect the wire component through the air-operated tube network.

In accordance with one or more aspects of the disclosed embodiment, the method further comprises controlling the manifold with a system controller, where the system controller operates the manifold to route the wire component from the transport source station and the at least one transport destination station.

In accordance with one or more aspects of the disclosed embodiment, the method further includes controlling the pressurization of the air-operated tube network with a sensor arranged at an end or along the length of the air-operated tube network and a system controller.

In accordance with one or more aspects of the disclosed embodiment, the method further includes controlling the routing of the wire component through a predetermined route of the air-operated tube network with a system controller and a sensor arranged at an end or along the length of the air-operated tube network.

In accordance with one or more aspects of the disclosed embodiment, the method further includes controlling at least one assembly step of the source station with a system controller based on signals provided by a sensor arranged at an end or along the length of the air-operated tube network.

In accordance with one or more aspects of the disclosed embodiment, the at least one assembly step includes at least one of informing a system controller of the status of an assembly process, initiating the assembly of a next wire component or controlling when the next wire component may be routed into the air-operated tube network from the transport source station.

In accordance with one or more aspects of the disclosed embodiment, the method further includes determining a location of the wire component within the air-operated tube network based on signals provided by a sensor arranged at an end or along the length of the air-operated tube network.

In accordance with one or more aspects of the disclosed embodiment, the method further includes signaling a system controller to effect one or more wire component preparation steps based on signals provided by a sensor arranged at an end or along the length of the air-operated tube network.

In accordance with one or more aspects of the disclosed embodiment, a non-transitory computer readable medium having computer readable program code embodied therein for transporting wire components, when executed, includes pneumatically transporting a wire component from a transport source station to at least one transport destination station through an air-operated tube network connecting the transport source station and the at least one transport destination station based on a wire bundle assembly program.

In accordance with one or more aspects of the disclosed embodiment, the non-transitory computer readable medium further comprises computer readable program code embodied therein for transporting wire components that, when executed, performs a first wire component preparation task with the transport source station where the first wire component preparation task includes at least one of wire component cutting, wire component marking, component stripping, or crimping of electrical contacts onto the end of the wire component.

In accordance with one or more aspects of the disclosed embodiment, the non-transitory computer readable medium further comprises computer readable program code embodied therein for transporting wire components that, when executed, performs a second wire component preparation task with the at least one transport destination station where the second wire component preparation task includes at least one of wire component cutting, wire component marking, wire component stripping, crimping electrical contacts onto the end of the wire component, forming a wire bundle, tying a wire component bundle or coiling a wire component.

In accordance with one or more aspects of the disclosed embodiment, the non-transitory computer readable medium further comprises computer readable program code embodied therein for transporting wire components that, when executed, performs providing a positive fluid flow within the air-operated tube network with a pressurized fluid flow source during the pneumatic transportation of the wire component from the transport source station to the at least one transport destination station.

In accordance with one or more aspects of the disclosed embodiment, the non-transitory computer readable medium further comprises computer readable program code embodied therein for transporting wire components that, when executed, performs providing a negative fluid flow within the air-operated tube network with a vacuum fluid flow source during the pneumatic transportation of the wire component from the transport source station to the at least one destination station.

In accordance with one or more aspects of the disclosed embodiment, the non-transitory computer readable medium further comprises computer readable program code embodied therein for transporting wire components that, when executed, performs redirecting the wire component from the transport source station to the at least one transport destination station through a manifold configured to redirect the wire component through the air-operated tube network.

In accordance with one or more aspects of the disclosed embodiment, the non-transitory computer readable medium further comprises computer readable program code embodied therein for transporting wire components that, when executed, performs controlling the manifold to route the wire component from the transport source station and the at least one transport destination station.

In accordance with one or more aspects of the disclosed embodiment, the non-transitory computer readable medium further comprises computer readable program code embodied therein for transporting wire components that, when executed, performs controlling the pressurization of the air-operated tube network with at least a sensor arranged at an end or along the length of the air-operated tube network and the system controller.

In accordance with one or more aspects of the disclosed embodiment, the non-transitory computer readable medium further comprises computer readable program code embodied therein for transporting wire components that, when executed, performs controlling the routing of the wire component through a predetermined route of the air-operated tube network with the system controller and at least a sensor arranged at an end or along the length of the air-operated tube network.

In accordance with one or more aspects of the disclosed embodiment, the non-transitory computer readable medium further comprises computer readable program code embodied therein for transporting wire components that, when executed, performs controlling at least one assembly step of the transport source station with the system controller based on signals provided by at least a sensor arranged at an end or along the length of the air-operated tube network.

In accordance with one or more aspects of the disclosed embodiment, the non-transitory computer readable medium further comprises computer readable program code embodied therein for transporting wire components that, when executed, performs determining a location of the wire component within the air-operated tube network based on signals provided by at least a sensor arranged at an end or along the length of the air-operated tube network In accordance with one or more aspects of the disclosed embodiment, the non-transitory computer readable medium further comprises computer readable program code embodied therein for transporting wire components where the at least one assembly step include at least one of initiating the assembly of a next wire component or controlling when the next wire component may be routed into the air-operated tube network from the transport source station based on an assembly status.

What is claimed is:

1. A system for transporting wire components during the assembly of wire bundles comprising:
    an air-operated tube network connecting a transport source station to a plurality of transport destination stations, the air-operated tube network comprising: a junction coupled between the transport source station and the plurality of transport destination stations; and
    a system controller, wherein the system controller includes a wire bundle assembly program, the system controller is programmed to automatically transmit wire components from the source station to at least one of the transport destination stations based on the wire bundle assembly program.

2. The system of claim 1, wherein the junction coupled between the transport source station and the plurality of transport destination stations, is controlled by the system controller.

3. The system of claim 1, further comprising at least one manifold, where the system controller operates the at least one manifold to route the wire components from the transport source station to a predetermined transport destination station.

4. The system of claim 1, further comprising a set of air control valves configured to enable the wire components from the transport source station to be selectively routed to a predetermined transport destination station.

5. The system of claim 4, further comprising at least one sensor configured to enable the system controller to control the set of air control valves to effect routing of the wire components through a predetermined route between the transport source station and the predetermined transport destination station.

6. The system of claim 1, further comprising one or more sensors configured to determine a location of the wire components within the air-operated tube network.

7. The system of claim 1, further comprising at least one sensor at one or more ends of the air-operated tube network configured to control pressurization of the air-operated tube network.

8. The system of claim 1, further comprising at least one sensor at one or more ends of the air-operated tube network configured to signal the system controller to effect one or more wire component preparation steps at the transport source station.

9. The system of claim 8, wherein the one or more wire component preparation steps includes at least one of informing the system controller of a status of an assembly process, initiating an assembly of the wire component or controlling when the next wire component may be routed into the air-operated tube network from the transport source station.

10. A method for transporting wire components during the assembly of wire bundles, the methods comprising:
    pneumatically transporting wire components from a transport source station to at least one of a plurality of transport destination stations through an air-operated tube network that includes a junction coupled between the transport source station and the plurality of transport destination stations, wherein the air-operated tube network connects the transport source station and the plurality of transport destination stations based on a wire bundle assembly program, wherein the wire bundle assembly program is included in a system controller and the system controller is programmed to automatically transmit the wire components from the source station to the at least one of the plurality of transport destination stations based on the wire bundle assembly program.

11. The method of claim 10, further comprising controlling a pressurization of the air-operated tube network with a sensor arranged at an end or along a length of the air-operated tube network and the system controller.

12. The method of claim 10, further comprising controlling the routing of the wire component through a predetermined route of the air-operated tube network with the system controller and a sensor arranged at an end or along a length of the air-operated tube network.

13. The method of claim 10, further comprising controlling at least one assembly step of the source station with the system controller based on signals provided by a sensor arranged at an end or along a length of the air-operated tube network.

14. The method of claim 10, further comprising determining a location of the wire component within the air-operated tube network based on signals provided by a sensor arranged at an end or along a length of the air-operated tube network.

15. The method of claim 10, further comprising signaling a system controller to effect one or more wire component preparation steps based on signals provided by a sensor arranged at an end or along a length of the air-operated tube network.

16. A non-transitory computer readable medium having computer readable program code embodied therein for transporting wire components that, when executed, performs:
    pneumatically transporting a wire component from a transport source station to at least one transport destination station through an air-operated tube network connecting the transport source station and the at least one transport destination station, wherein pneumatically transporting the wire component is based on a wire bundle assembly program.

17. The non-transitory computer readable medium of claim 16, further comprising computer readable program code embodied therein for transporting wire components that, when executed, performs controlling a pressurization of the air-operated tube network with at least a sensor arranged at an end or along a length of the air-operated tube network.

18. The non-transitory computer readable medium of claim 16, further comprising computer readable program code embodied therein for transporting wire components that, when executed, performs controlling a routing of the wire component through a predetermined route of the air-operated tube network with at least a sensor arranged at an end or along a length of the air-operated tube network.

19. The non-transitory computer readable medium of claim 16, further comprising computer readable program code embodied therein for transporting wire components that, when executed, performs controlling at least one assembly step of the transport source station based on signals provided by at least a sensor arranged at an end or along a length of the air-operated tube network.

20. The non-transitory computer readable medium of claim 16, further comprising computer readable program code embodied therein for transporting wire components that, when executed, performs determining a location of the wire component within the air-operated tube network based on signals provided by at least a sensor arranged at an end or along a length of the air-operated tube network.

\* \* \* \* \*